(12) United States Patent
Chen et al.

(10) Patent No.: US 8,699,963 B2
(45) Date of Patent: Apr. 15, 2014

(54) MOBILE COMMUNICATION DEVICE WITH RECEIVER SPEAKER

(75) Inventors: Chao Chen, Waterloo (CA); Li Huang, Kitchener (CA); Dan Kaufman, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 174 days.

(21) Appl. No.: 13/239,485

(22) Filed: Sep. 22, 2011

(65) Prior Publication Data

US 2013/0078930 A1 Mar. 28, 2013

(51) Int. Cl.
*H04B 1/40* (2006.01)

(52) U.S. Cl.
USPC .................. 455/74; 381/11; 381/12; 381/80; 381/28; 381/1

(58) Field of Classification Search
USPC .................. 381/1, 28, 81, 11, 12, 80, 110
See application file for complete search history.

(56) References Cited

U.S. PATENT DOCUMENTS

| 2002/0042287 | A1 | 4/2002 | Asami |
| 2002/0137478 | A1 | 9/2002 | Masamura |
| 2003/0123677 | A1* | 7/2003 | Tran ................................. 381/81 |
| 2004/0253994 | A1* | 12/2004 | Lampl et al. ............... 455/569.1 |
| 2004/0259513 | A1 | 12/2004 | Park |
| 2008/0159567 | A1 | 7/2008 | Lesso et al. |
| 2010/0027799 | A1* | 2/2010 | Romesburg et al. ............ 381/28 |
| 2010/0311465 | A1* | 12/2010 | Lai ............................. 455/556.2 |

OTHER PUBLICATIONS

Banerjea, Robin, Extended European Search Report for EP 11182312.6, Feb. 27, 2012.
iFixit.com, "Installing iPhone 4 Speaker Enclosure", 2010, retrieved online Sep. 5, 2010.
Wikipedia, "iPhone", pp. 4-5 "Audio and output", retrieved online Sep. 3, 2010 at http://en.wikipedia.org/wiki/IPhone.

* cited by examiner

*Primary Examiner* — Edward Urban
*Assistant Examiner* — Max Mathew
(74) *Attorney, Agent, or Firm* — Integral Intellectual Property Inc.; Miriam Paton

(57) ABSTRACT

An audio subsystem in a mobile communication device has a speaker. In one implementation, the audio subsystem has a higher-gain power amplifier, a lower-gain power amplifier, and a switching system configured to route signals produced by the lower-gain power amplifier to the speaker while the device is operative in a first mode and configured to route signals produced by the higher-gain power amplifier to the speaker while the device is operative in a second mode. In another implementation, the audio subsystem has a power amplifier coupled to the speaker and a power supply control controlled to provide voltage at a first voltage level to the power amplifier while the device is operative in a first mode and controlled to provide voltage at a second, higher, voltage level to the power amplifier while the device is operative in a second mode.

17 Claims, 9 Drawing Sheets

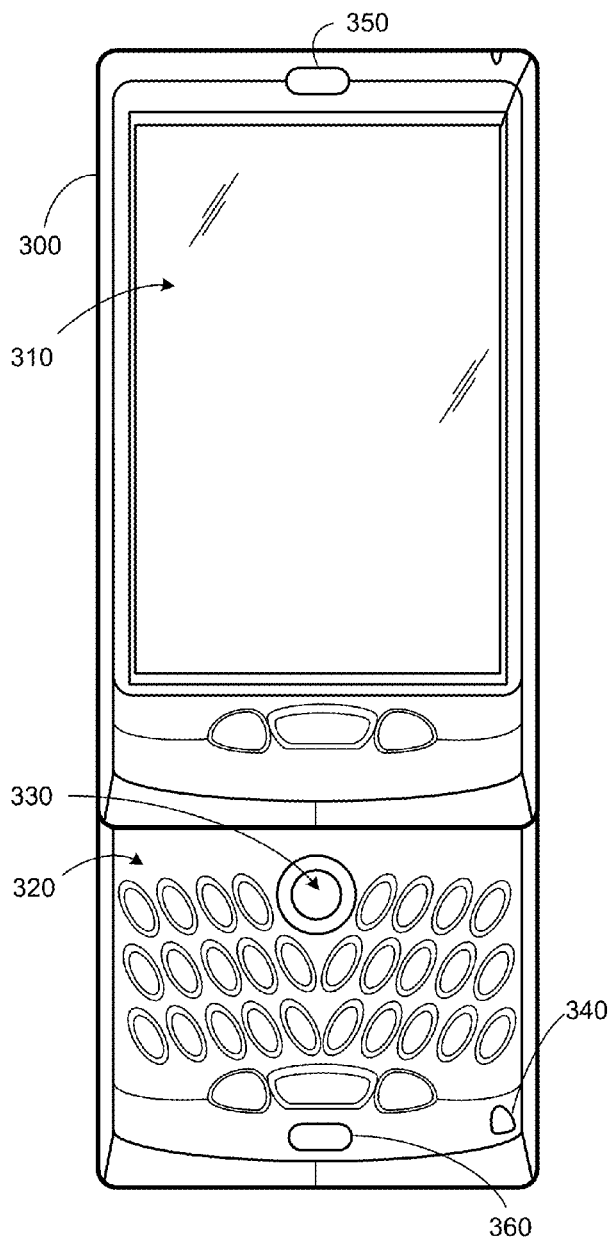
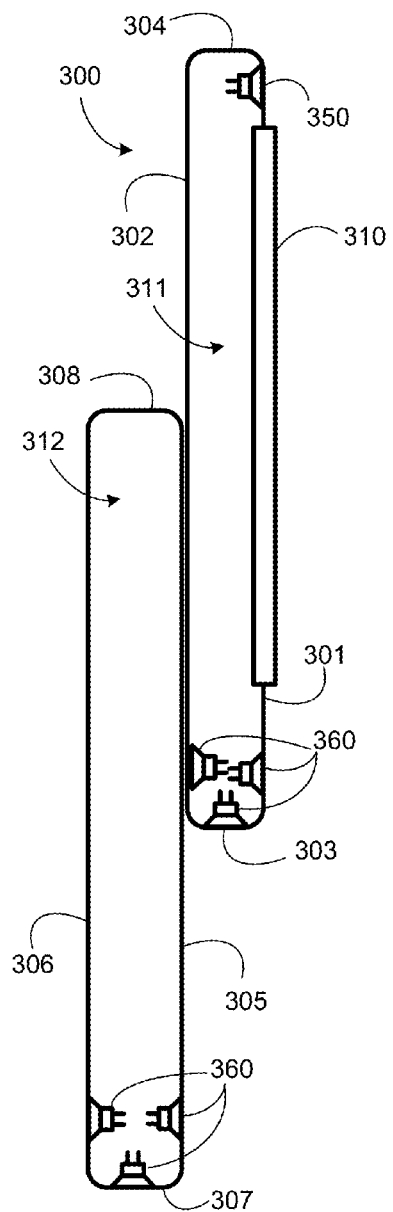
FIG. 4-1    FIG. 4-2

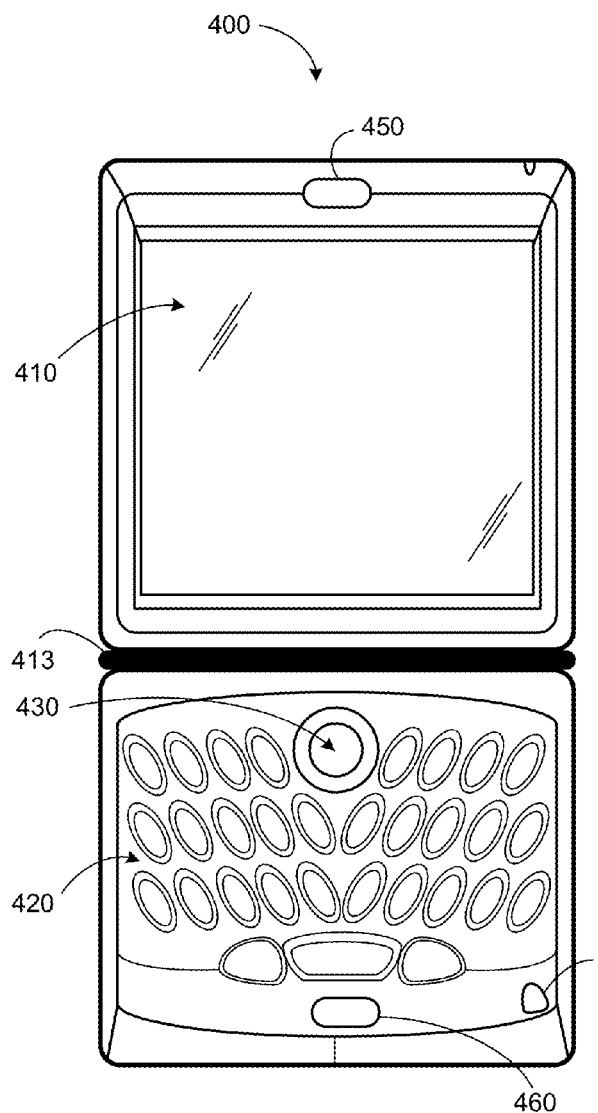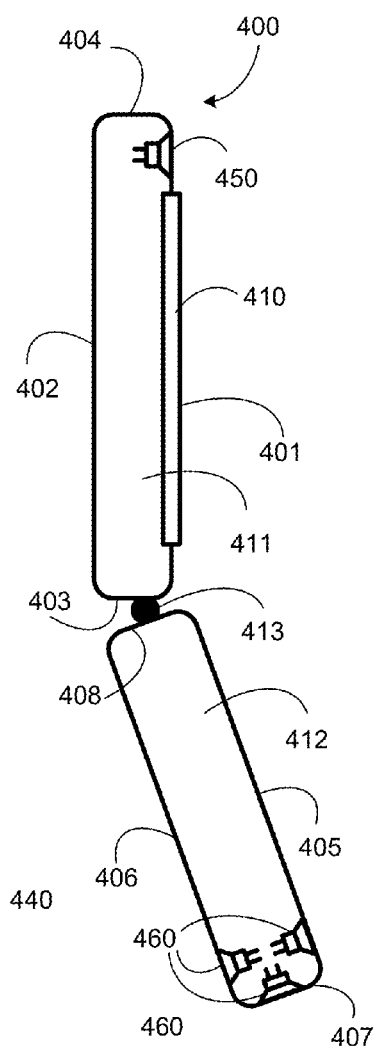
FIG. 5-1  FIG. 5-2

MOBILE COMMUNICATION DEVICE WITH RECEIVER SPEAKER

BACKGROUND

Current mobile communication devices are increasingly used as multipurpose devices in addition to providing voice communications such as telephone calls. For example, mobile communication devices can run one or more software applications including address books, e-mail client applications, and instant messaging client applications. In addition, mobile communication devices can be used to browse the Internet and play various forms of media including, for example, audio or video or both. Mobile communication devices are increasingly being used as media players, and the quality of sound output from a mobile communication device may be one factor in deciding which mobile communication device to purchase.

BRIEF DESCRIPTION OF THE DRAWINGS

Embodiments are illustrated by way of example and not limitation in the figures of the accompanying drawings, in which like reference numerals indicate corresponding, analogous or similar elements, and in which:

FIGS. 2-1 and 2-2 show a front view and a side view, respectively, of an example mobile communication device having a bar form factor;

FIGS. 3-1 and 3-2 show a front view and a side view, respectively, of an example mobile communication device having a slate form factor;

FIGS. 4-1 and 4-2 show a front view and a side view, respectively, of an example slider mobile communication device;

FIGS. 5-1 and 5-2 show a front view and a side view, respectively, of an example flip or clamshell mobile communication device;

FIG. 7-1 is a simplified functional block diagram of portions of an example audio subsystem;

FIG. 7-2 is a simplified functional block diagram of portions of another example audio subsystem.

Figure 1:
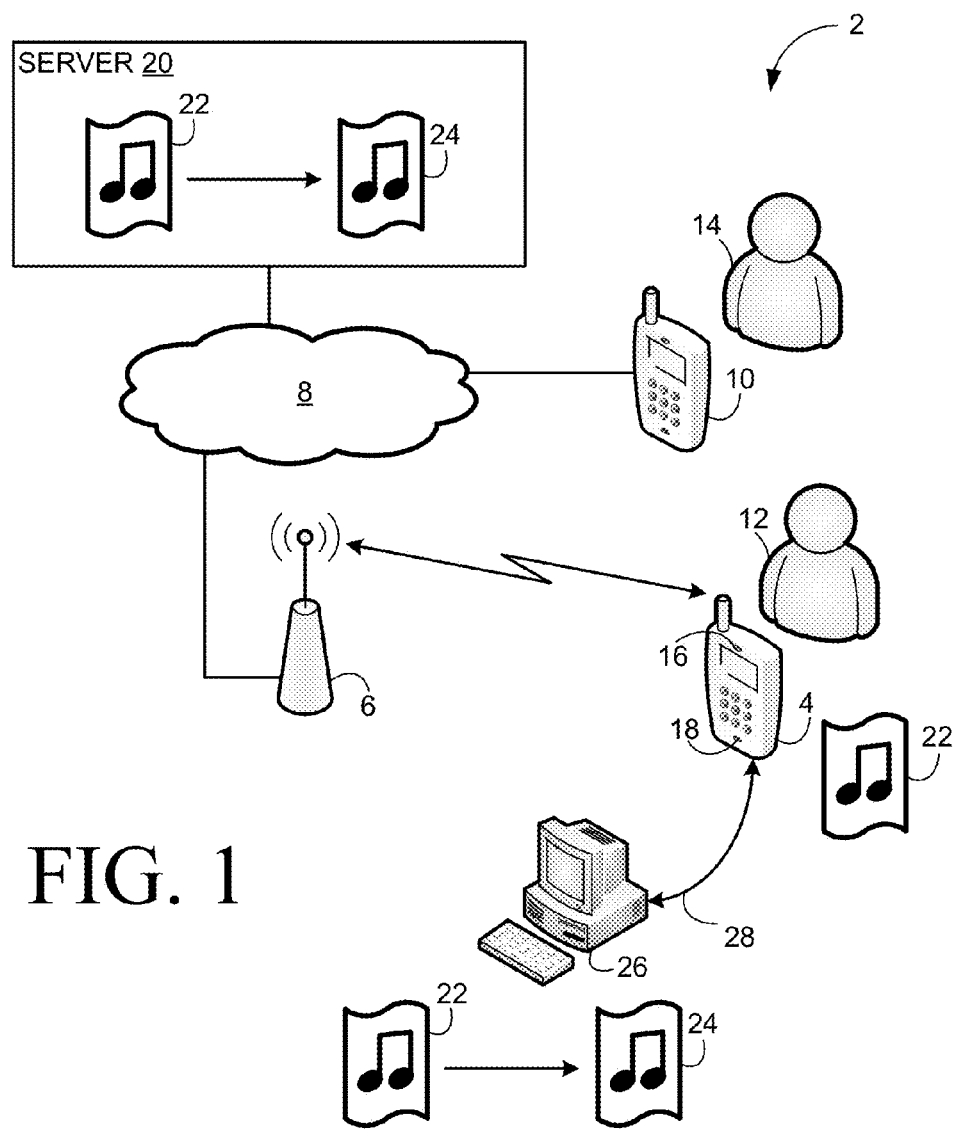
FIG. 1 shows an example of a system including a mobile communication device.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Mobile communication devices that are arranged for voice communications, such as telephone calls and Voice over Internet Protocol (VoIP) calls, typically include a "receiver" speaker and a "handsfree" speaker for reproducing audible sound originating from a party on the other end of a conversation. By design, the maximal power level of sound waves to be produced by the receiver speaker is limited to a power level suitable for the receiver speaker to be in close proximity to a human ear, for example, less than approximately 1.5 centimeters (cm) away. In other words, no matter what the source of the sound to be produced by the receiver speaker, and no matter how high the various volume settings—mechanical or software or otherwise—of the mobile communication device, the receiver speaker is not physically capable of producing sound that is louder than its maximal power level. Providing the receiver speaker with analog signals stronger than its maximal power level may result in damage to the receiver speaker. In a non-limiting example, the maximal power level of the sound waves to be produced by the receiver speaker may be in the range of approximately 10 milliWatts (mW) to approximately 50 mW. "Suitability" of the maximal power level may be determined by any combination of factors, for example, improved ear safety, local regulation, and comfort of usage.

By design, the maximal power level of sound waves to be produced by the handsfree speaker may be in a range suitable to be further from a human ear, for example, more than approximately 50 cm away. In other words, no matter what the source of the sound to be produced by the handsfree speaker, and no matter how high the various volume settings—mechanical or software or otherwise—of the mobile communication device, the handsfree speaker is not physically capable of producing sound that is louder than its maximal power level. Providing the handsfree speaker with analog signals stronger than its maximal power level may result in damage to the handsfree speaker. In a non-limiting example, the maximal power level of the sound waves to be produced by the handsfree speaker may be in the range of approximately 500 mW to approximately 1500 mW. Typically, the components of the handsfree speaker are larger and more expensive than the components of the receiver speaker, although this is not necessarily the case.

A mobile communication device that, in addition to its voice communications functionality, has the functionality of a media player may be arranged to reconstruct sound from digital audio contained in files stored in the mobile communication device or from digital audio that is received in real time ("streamed") from an external source or from both. In a non-limiting example, the digital audio may represent music, sound tracks, sound effects, recordings of conversations, podcasts, recordings of electronic books (eBooks) and the like. The digital audio may be "standalone" or may be accompanied by other media information, such as digital video. For example, a file that contains both digital audio and digital video may be stored in or streamed to the mobile communication device. The mobile communication device may reconstruct the sound through the receiver speaker or through the handsfree speaker and may display the video on a screen in a manner synchronized to the sound.

Digital audio played by the media player functionality of the mobile communication device may be more suitable for the handsfree speaker than for the receiver speaker, because the handsfree speaker can reproduce sound at a higher power and a higher quality than the receiver speaker.

In many cases, stored digital audio or streamed digital audio is provided in two synchronized "stereo" components, one usually labeled as the "left audio channel" and the other as the "right audio channel". Having a mobile communication device reproduce two separate audio channels simultaneously may provide enhanced sound quality and may improve the user's listening experience.

One possible way to achieve simultaneous reproduction of two separate audio channels is to add another speaker in the mobile communication device—in addition to the handsfree speaker and the receiver speaker—such that the mobile communication device is arranged to reproduce sound via the additional speaker at a power level similar to that of the handsfree speaker. In this case, the mobile communication device has three speakers: one receiver speaker and two high-power speakers (one of which is the handsfree speaker). For example, the left audio channel may be played through the handsfree speaker and the right audio channel may be played through the other high-power speaker. However, as many manufacturers strive to produce mobile communication devices that are small in size, they have to consider the tradeoff between a desired small size of the mobile communication device, which may be difficult to achieve with three speakers, especially when two of them are high-power speakers, and the enhanced sound quality that may be achieved by adding the additional high-power speaker to the mobile communication device. As a result, many existing mobile communication devices, even those with well-developed media-playing software functionality, include only one high power speaker and do not support media reproduction of two audio channels simultaneously. Such mobile communication devices typically are arranged to combine the left audio channel and the right audio channel into one "mono" audio stream that is reproduced via the single high-power, handsfree speaker. Although unlikely, it is possible that such mobile communication devices are arranged to reproduce only one of the left audio channel and the right audio channel via the handsfree speaker and to omit or to mute the other audio channel.

In theory, a mobile communication device having a single handsfree speaker and a receiver speaker may be able to reproduce both the left audio channel and the right audio channel simultaneously by reproducing one audio channel on the handsfree speaker and the other audio channel on the receiver speaker. However, because the maximal power level of the sound waves produced by the receiver speaker may be much lower than the maximal power level of the sound waves produced by the handsfree speaker, playback of the two stereo audio channels in this manner may be uneven in power or quality or both.

As described herein, a receiver speaker is comprised in an audio subsystem of a mobile communication device, and the mobile communication device is arranged to select between a first mode of operation, referred to herein as the "call mode", and a second mode of operation, referred to herein as the "multimedia mode". The mobile communication device may operate in the call mode when conducting voice communications, for example, a telephone call or a VoIP call. The mobile communication device may operate in the multimedia mode when voice communications involving the mobile communication device, for example, a telephone call or a VoIP call, are in progress and handsfree operation of the mobile communication device has been selected. In another example, the mobile communication device may operate in the multimedia mode during reproduction of sound from digital audio from media files or from a streaming buffer or from both.

While operative in the call mode, the mobile communication device limits the maximal power level of sound waves to be produced by the receiver speaker to a power level suitable for the receiver speaker to be in close proximity to a human ear, for example, less than approximately 1.5 cm away. In other words, upon selection of the call mode, the mobile communication device configures its audio subsystem, such that the audio subsystem is prevented from generating sound waves having a power level that exceeds a first threshold, referred to herein as the "call mode maximal power level".

While operative in the multimedia mode, the mobile communication device limits the maximal power level of sound waves to be produced by the receiver speaker to a power level suitable for the receiver speaker to be further from a human ear, for example, more than approximately 50 cm away. In other words, upon selection of the multimedia mode, the mobile communication configures its audio subsystem such that the audio subsystem is prevented from generating sound waves having a power level that exceeds a second threshold, referred to herein as the "multimedia mode maximal power level", where the second threshold is higher than the first threshold.

The audio subsystem of the mobile communication device may optionally comprise a handsfree speaker in addition to the receiver speaker. While operative in the multimedia mode, the mobile communication device may use both the handsfree speaker and the receiver speaker to reproduce sound. For example, the mobile communication device, while operative in the multimedia mode, may use the handsfree speaker to reproduce one of two audio channels and the receiver speaker to reproduce the other of the two audio channels simultaneously at high power. Note that this is accomplished without incorporating a third speaker in the mobile communication device. In another example, the mobile communication device, operating in the multimedia mode, may use the receiver speaker and the handsfree speaker to simultaneously reproduce the same audio channel, for example, a mono audio channel.

The call mode maximal power level and the multimedia mode maximal power level may be defined in any suitable way, for example by root mean square (RMS), by peak power, or by both. Regardless of the exact definition, the call mode maximal power level might be much lower than the multimedia mode maximal power level. The call mode maximal power level might be determined to protect the human ear, while the multimedia mode maximal power level might be determined by other considerations, such as power capabilities of the mobile communication device. In a non-limiting example, the call mode maximal power level might be in the range of approximately 10 mW to approximately 50 mW, while the multimedia mode maximal power level might be in the range of approximately 500 mW to approximately 1500 mW.

As discussed in more detail below with respect to FIG. 7, the power of sound waves that a speaker in a mobile communication device can generate will depend on many factors, including, for example, (i) the sound that is represented by the digital audio, (ii) volume settings of one or more mechanical elements of the mobile communication device, (ii) volume settings of one or more software elements of the mobile communication device, (iii) voltage applied to a power amplifier and/or other hardware elements coupled to the speaker, and (iv) physical limitations of the speaker.

In one example, while the mobile communication device is operative in the call mode, a switching system enables the receiver speaker to receive signals produced by a lower-gain power amplifier. While the mobile communication device is operative in the multimedia mode, the switching system enables the receiver speaker to receive signals produced by a higher-gain power amplifier. The amplitude of signals provided by the lower-gain power amplifier to the receiver speaker is lower than the amplitude of signals provided by the higher-gain power amplifier to the receiver speaker.

In another example, the receiver speaker is able to receive signals produced by a power amplifier in both the call mode and the multimedia mode. While the mobile communication device is operative in the call mode, a power supply control is controlled to provide a first voltage level to the power amplifier and while the mobile communication device is operative in the multimedia mode, the power supply control is controlled to provide a second voltage level to the power amplifier, where the second voltage level is higher than the first voltage level. The amplitude of signals provided by the power amplifier to the receiver speaker is higher where the power supply control is controlled to provide the second voltage level to the power amplifier than the amplitude of signals provided by the power amplifier to the receiver speaker where the power supply control is controlled to provide the first voltage level to the power amplifier.

The selected mode, that is, the call mode or the multimedia mode, provides an upper limit to the level of sound "volume" that can be selected by a user. For example, while the mobile communication device is operative in the call mode, increases in the volume settings of one or more mechanical elements or one or more software elements of the mobile communication device, in the absence of any change in the sound represented by the digital audio and in the absence of any change in voltage applied to a power amplifier and/or other hardware elements coupled to the receiver speaker, will cause the power level of the sound waves produced by the receiver speaker to increase, as long as the power level of the sound waves produced by the receiver speaker does not exceed the call mode maximal power level. However, once the call mode maximal power level has been reached, increases in the volume settings, in the absence of any change in the sound represented by the digital audio and in the absence of any change in voltage applied to a power amplifier and/or other hardware elements coupled to the receiver speaker, will have no effect on the power level of the sound waves produced by the receiver speaker while the mobile communication device is operative in the call mode.

The call mode and the multimedia mode are selectable in the mobile communication device. Conditions for selecting between the call mode and the multimedia mode are described below with respect to FIG. 6 and FIG. 8.

A non-exclusive list of mobile communication devices includes, for example, smart phones, cellular phones, Voice over Internet Protocol (IP) phones, tablet computers, slate computers, notepad computers, gaming devices, e-readers, etc. The mobile communication devices may be handheld, that is, sized or shaped to be held or carried in a human hand, or may be of a larger size or shape.

FIG. 1 shows an example of a system 2 including a mobile communication device 4. Mobile communication device 4 is capable of wireless communication with a wireless access unit 6 according to a wireless communication protocol. For example, mobile communication device 4 and wireless access unit 6 may communicate using a cellular communication standard such as Global System for Mobile Communications (GSM) or Code Division Multiple Access (CDMA), a Wireless Local Area Network (WLAN) communication standard such as the Institute of Electrical and Electronic Engineers 802.11 standard (IEEE 802.11), a Personal Area Network (PAN) communication protocol such as Bluetooth®, or any other suitable protocol or standard. According to the naming conventions used in the descriptions of such communication protocols, wireless access unit 6 may be referred to as an access point, a communication tower, a directed cell, a piconet device, or any other suitable name. In FIG. 1, wireless access unit 6 may represent a plurality of wireless access units that may operate using different wireless communication protocols. Mobile communication device 4 may be capable of wireless communication using a plurality of wireless communication protocols, possibly simultaneously.

Wireless access unit 6 may be able to communicate with a network 8, which may include, for example, any combination of cellular networks, Public Switched Data Networks (PSDNs), Public Switched Telephone Networks (PSTNs), Wide Area Networks (WANs), Local Area Networks (LANs), WLANs, private networks, home networks, public networks and the Internet. A communication device 10 is capable of communicating with mobile communication device 4 via network 8.

In one example, a user 12 of mobile communication device 4 and a user 14 of communication device 10 may converse with each other using mobile communication device 4 and communication device 10, respectively, and mobile communication device 4 may be operated in a call mode. When mobile communication device 4 is operative in the call mode, a handsfree speaker 18 of mobile communication device 4 may be muted and a receiver speaker 16 of mobile communication device 4 may reproduce sound at a power level suitable for receiver speaker 16 to be in close proximity to a human ear, where the sound originates from user 14 and is received by mobile communication device 4 via network 8.

A server 20 may also be in communication with network 8 and may be able to communicate with mobile communication device 4.

In another example, server 20 may store a media file 22, including digital audio and optionally other media content such as digital video. Mobile communication device 4 may be able to receive media file 22 from server 20 via network 8 and to store media file internally. User 12 may then operate mobile communication device 4 to "play" media file 22 such that mobile communication device 4, operated in multimedia mode, reproduces digital audio stored in media file 22 via receiver speaker 16 and via handsfree speaker 18.

In another example, server 20 may stream media file 22 to mobile communication device 4 instead of transferring it. Streaming techniques are known in the art, and the following description of streaming is intentionally simplified so as not to obscure the understanding of the technology described herein. Media file 22 may be a compressed file or an encoded file or both. Server 20 may decompress and/or decode media file 22 to generate decompressed digital audio 24, which may have a larger accumulated size than media file 22. Server 20 may "feed" mobile communication device 4 with portions of decompressed digital audio 24 such that, at each particular moment, mobile communication device 4 has sufficient digital audio 24 to continue "playing" the sounds without disruption, for example, as if the media file 22 was stored within mobile communication device 4. User 12 may operate mobile communication device 4 to "play" the streamed audio such that mobile communication device 4, operated in multimedia mode, reproduces sound from decompressed digital audio 24 via receiver speaker 16 and via handsfree speaker 18.

In another example, mobile communication device 4 may be in communication with a computer 26 over a cable 28. For example, cable 28 may be a Universal Serial Bus (USB) cable. Computer 26 may store media file 22. Mobile communication device 4 may be able to receive media file 22 from computer 26 over cable 28. Alternatively, computer 26 may stream media file 22 to mobile communication device 4 over cable 28 by first decompressing and/or decoding media file 22 to generate decompressed digital audio 24.

Figure 2:
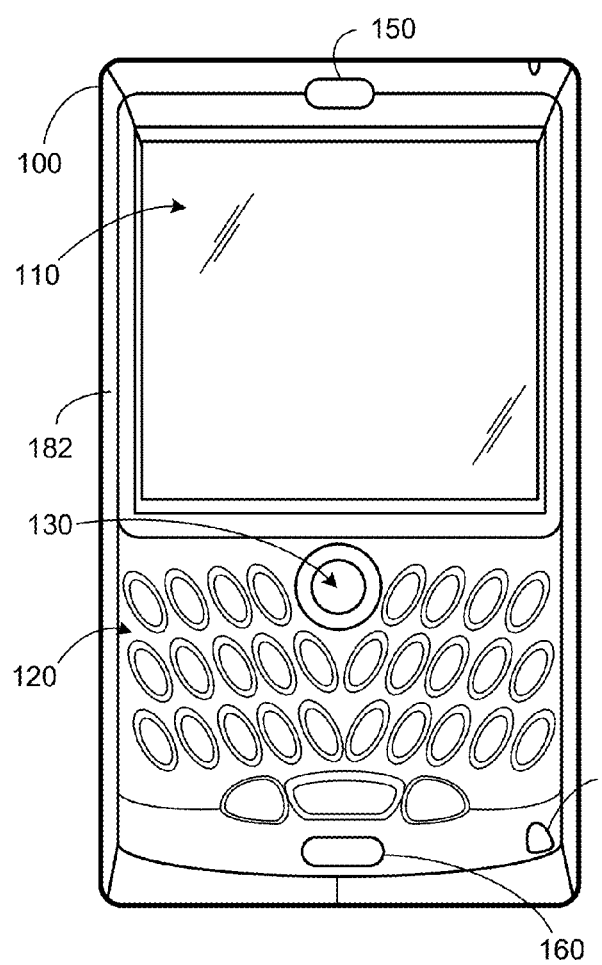
Figure 1:
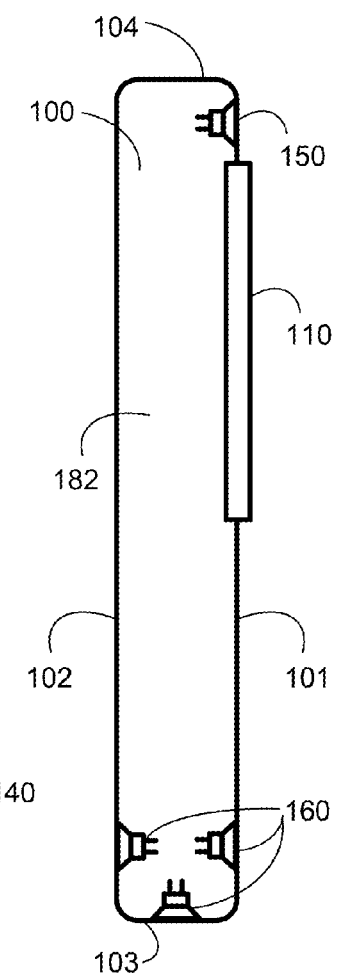
Figures 1, 2, 3:
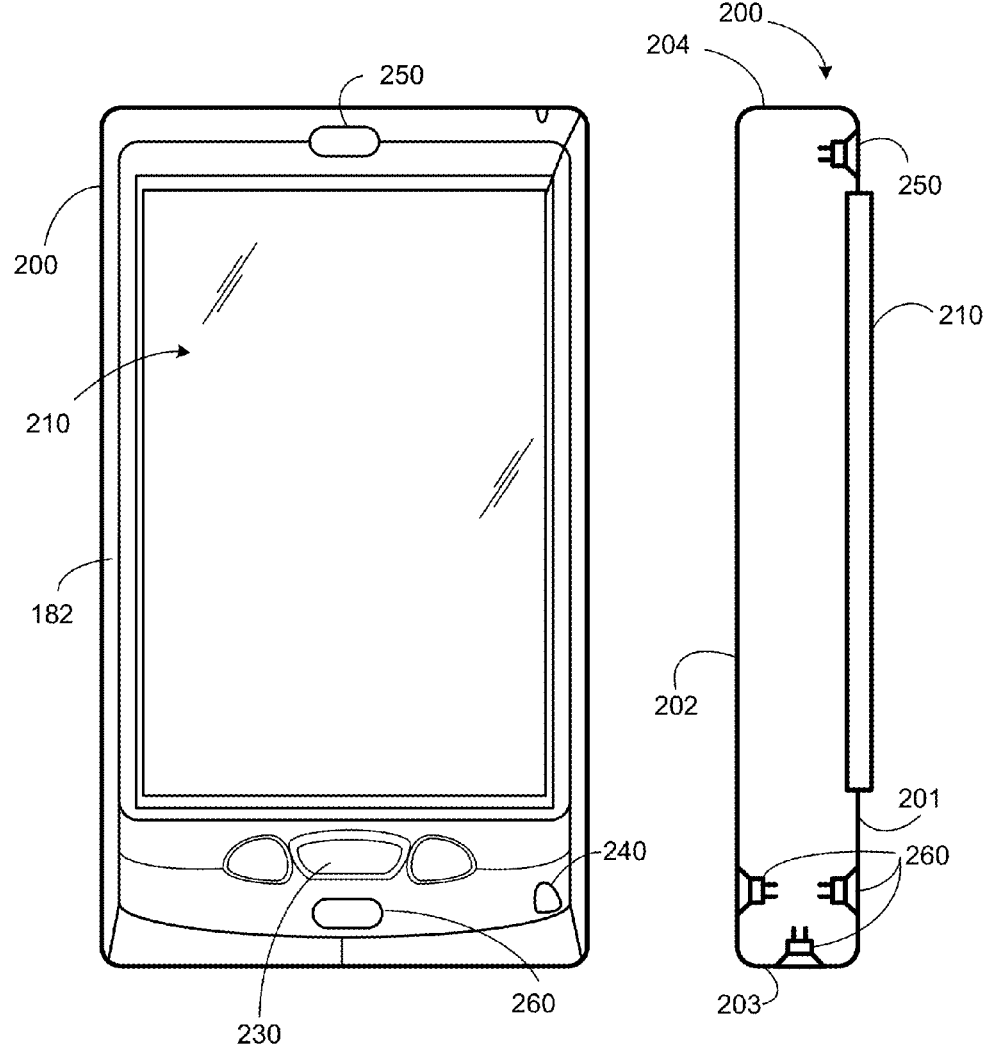

FIGS. 2-1 and 2-2 illustrate a front view and a side view, respectively, of an example mobile communication device 100 having a bar form factor. FIGS. 3-1 and 3-2 illustrate a front view and a side view, respectively, of an example mobile communication device 200 having a slate form factor. FIGS. 4-1 and 4-2 illustrate a front view and a side view, respectively, of an example slider mobile communication device 300. FIGS. 5-1 and 5-2 illustrate a front view and a side view, respectively, of an example flip or clamshell mobile communication device 400. Devices 100, 200, 300 and 400 are non-limiting examples of mobile communication device 4 of FIG. 1.

Referring to FIGS. 2-1 and 2-2, example mobile communication device 100 includes a display 110, for example, a liquid crystal display (LCD) or a light emitting diode (LED) display or an organic LED display. Display 110 may optionally have "touch screen" functionality, such that it is able to detect a presence and a location of a touch by an object, such as a stylus, or by a human body part, such as a fingertip, or by both, within the display area, and may therefore also be a user input component. Mobile communication device 100 may include other input components, for example, a keyboard 120, one or more navigation actuators 130 and one or more microphones 140. Additional user input components, such as individual keys, may be embedded in mobile communication device 100 and are not explicitly shown. Navigation actuators 130 may be, for example, thumbwheels, track pads, joysticks, capacitive touch pads, optical touch pads or any other types of navigation actuators. Mobile communication device 100 may include mechanical interfaces, such as a power connector jack, a data interface port such as a USB port, a headphone jack, and other mechanical interfaces that are not explicitly shown. Mobile communication device 100 includes a receiver speaker 150 and a handsfree speaker 160.

A housing of mobile communication device 100 has a front surface 101, a back surface 102, a bottom surface 103 that is near keyboard 120 and a top surface 104 that is near display 110. The terms "front", "back", "bottom" and "top" as used herein are provided for reference purposes only and do not suggest any particular orientation of mobile communication device 100 at any given time.

As an example, handsfree speaker 160 is shown installed closer to bottom surface 103 and facing any one of three optional directions: toward front surface 101, toward back surface 102 or toward bottom surface 103. As an example, receiver speaker 150 is shown installed closer to top surface 104 and facing front surface 101. Other installation positions and directions of receiver speaker 150 and of handsfree speaker 160 are contemplated.

Referring to FIGS. 3-1 and 3-2, exemplary mobile communication device 200 includes a display 210, for example, a LCD or a LED display or an OLED display. Display 210 may have touch screen functionality and may therefore also be a user input component. Mobile communication device 200 may include other input components, for example, one or more navigation actuators 230 and one or more microphones 240. Additional user input components, such as individual keys, may be embedded in mobile communication device 200 and are not explicitly shown. Navigation actuators 230 may be, for example, thumbwheels, track pads, joysticks, capacitive touch pads, optical touch pads or any other types of navigation actuators. Mobile communication device 200 may include mechanical interfaces, such as a power connector jack, a data interface port such as a USB port, a headphone jack, and other mechanical interfaces that are not explicitly shown. Mobile communication device 200 includes a receiver speaker 250 and a handsfree speaker 260.

A housing of mobile communication device 200 has a front surface 201, a back surface 202, a bottom surface 203 that is near navigation actuators 230 and a top surface 204. The terms "front", "back", "bottom" and "top" as used herein are provided for reference purposes only and do not suggest any particular orientation of mobile communication device 200 at any given time.

As an example, handsfree speaker 260 is shown installed closer to bottom surface 203 and facing any one of three optional directions: toward front surface 201, toward back surface 202 or toward bottom surface 203. As an example, receiver speaker 250 is shown installed closer to top surface 204 and facing front surface 201. Other installation positions and directions of receiver speaker 250 and of handsfree speaker 260 are contemplated.

Referring to FIGS. 4-1 and 4-2, example mobile communication device 300 includes two mechanical members 311 and 312 that can slide one in respect to the other. Member 311 has a front surface 301, a back surface 302, a bottom surface 303 and a top surface 304, while member 312 has a front surface 305, a back surface 306, a bottom surface 307 and a top surface 308. Front surface 305 and back surface 302 face each other. In a "closed" position of mobile communication device 300, front surface 305 and back surface 302 substantially overlap. In an "open" position of mobile communication device 300, front surface 305 and back surface 302 overlap less than in the closed position. The terms "front", "back", "bottom" and "top" as used herein are provided for reference purposes only and do not suggest any particular orientation of mobile communication device 300 at any given time.

Mobile communication device 300 includes a display 310, for example, a LCD or a LED display or an OLED display. Display 310 may optionally have touch screen functionality and may therefore also be a user input component. Mobile communication device 300 may include other input components, for example, a keyboard 320, one or more navigation actuators 330 and one or more microphones 340. In the closed position, keyboard 320 may be substantially covered by surface 302. In the open position, keyboard 320 may be substantially exposed.

Additional user input components, such as individual keys, may be embedded in mobile communication device 300 and are not explicitly shown. Navigation actuators 330 may be, for example, thumbwheels, track pads, joysticks, capacitive touch pads, optical touch pads or any other types of navigation actuators. Mobile communication device 300 may include mechanical interfaces, such as a power connector jack, a data interface port such as a USB port, a headphone jack, and other mechanical interfaces that are not explicitly shown. Mobile communication device 300 includes a receiver speaker 350 and a handsfree speaker 360.

As an example, handsfree speaker 360 is shown installed in member 312 closer to bottom surface 307 and facing any one of three optional directions: toward front surface 305, toward back surface 306 or toward bottom surface 307. As another example, handsfree speaker 360 is shown installed in member 311 closer to bottom surface 303 and facing any one of three optional directions: toward front surface 301, toward back surface 302 or toward bottom surface 303. As an example, receiver speaker 350 is shown installed in member 311 closer to top surface 304 and facing front surface 301. Other installation positions and directions of receiver speaker 350 and of handsfree speaker 360 are contemplated.

Referring to FIGS. 5-1 and 5-2, example mobile communication device 400 includes two mechanical members 411 and 412. Member 411 has a front surface 401, a back surface 302, a bottom surface 403 and a top surface 404, while member 412 has a front surface 405, a back surface 406, a bottom surface 407 and a top surface 408. Members 411 and 412 are connected to each other using a hinge 413 installed on surfaces 403 and 408.

In a "closed" position of mobile communication device 400, front surface 405 and front surface 401 substantially face each other. In an "open" position of mobile communication device 400, front surface 405 and front surface 401 face substantially the same direction. The terms "front", "back", "bottom" and "top" as used herein are provided for reference purposes only and do not suggest any particular orientation of mobile communication device 400, member 411 and member 412 at any given time.

Mobile communication device 400 includes a display 410, for example, a LCD or a LED display or an OLED display. Display 410 may optionally have touch screen functionality and may therefore also be a user input component. Mobile communication device 400 may include other input components, for example, a keyboard 420, one or more navigation actuators 430 and one or more microphones 440. In the closed position, keyboard 420 may be substantially covered by surface 401, while in the open position, keyboard 420 may be exposed.

Additional user input components, such as individual keys, may be embedded in mobile communication device 400 and are not explicitly shown. Navigation actuators 430 may be, for example, thumbwheels, track pads, joysticks, capacitive touch pads, optical touch pads or any other types of navigation actuators. Mobile communication device 400 may include mechanical interfaces, such as a power connector jack, a data interface port such as a USB port, a headphone jack, and other mechanical interfaces that are not explicitly shown. Mobile communication device 400 includes a receiver speaker 450 and a handsfree speaker 460.

As an example, handsfree speaker 460 is shown installed in member 412 closer to bottom surface 407 and facing any one of three optional directions: toward front surface 405, toward back surface 406 or toward bottom surface 407. As an example, receiver speaker 450 is shown installed in member 411 closer to top surface 404 and facing front surface 401. Other installation positions and directions of receiver speaker 450 and of handsfree speaker 460 are contemplated.

The form factors and styles of construction for the devices 100, 200, 300 and 400 are shown by way of example. Mobile communication devices having other form factors or styles of constructions are also contemplated.

Figure 6:
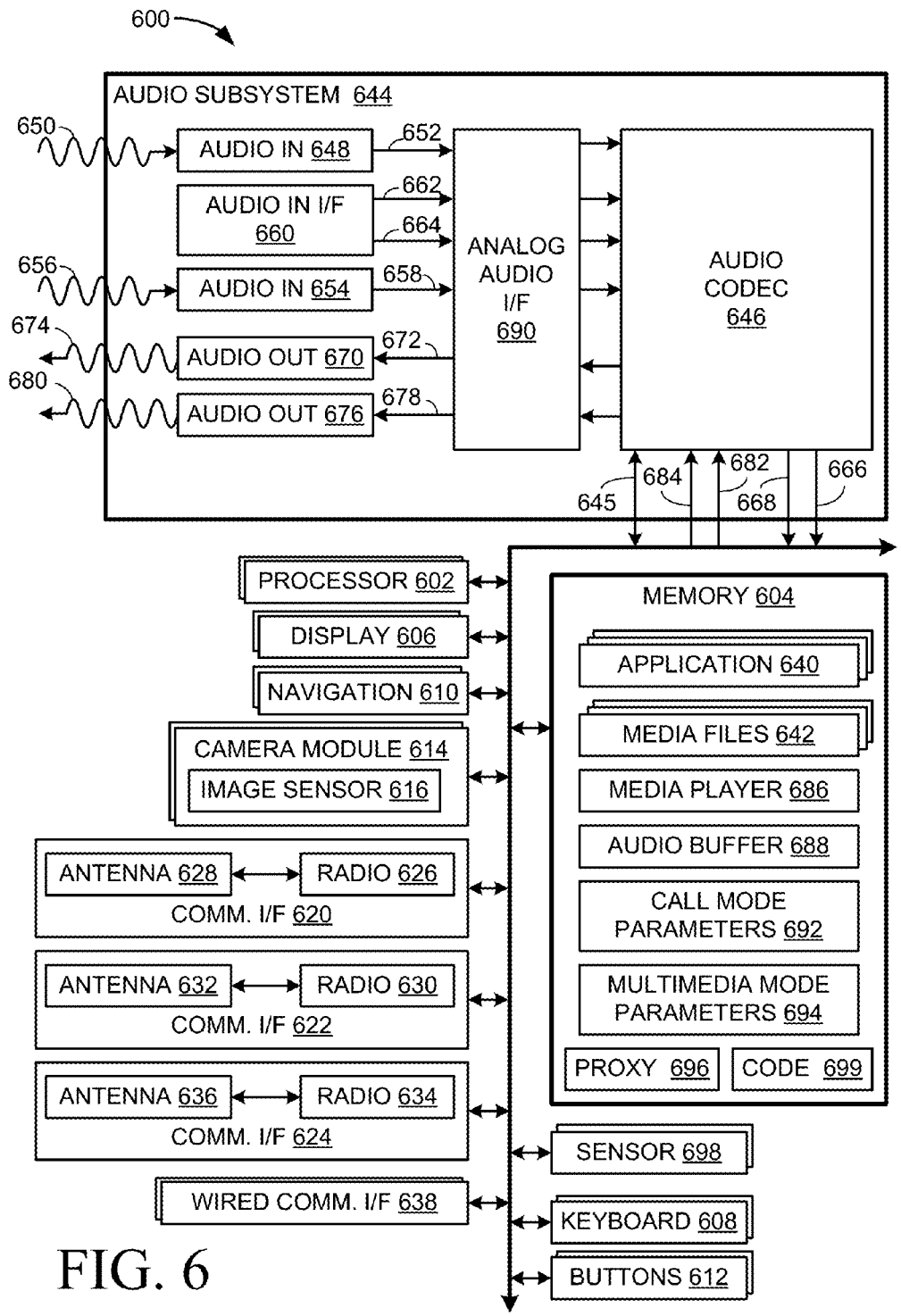
FIG. 6 is a simplified functional block diagram of an example mobile communication device.

FIG. 6 is a simplified functional block diagram of an example mobile communication device 600. For clarity, some components and features of mobile communication device 600 are not shown in FIG. 6 and are not explicitly described. Functions included in mobile communication device 600 may be implemented and distributed in any desired way among physical components of device 600, such as integrated circuits, discrete components, printed circuit boards (PCBs), assemblies and subassemblies. Mobile communication device 600 is an example of any one of mobile communication devices 4, 100, 200, 300 and 400. Any of mobile communication devices 4, 100, 200, 300 and 400 may include all the features or subsets of the features of mobile communication device 600, and may include features that are not described for mobile communication device 600.

Mobile communication device 600 includes a memory 604, one or more displays 606 and one or more keyboards 608, all coupled to one or more processors 602. Any of displays 606 may have touch screen functionality as described previously.

Mobile communication device 600 may include one or more navigation actuators 610 such as trackballs, thumbwheels, capacitive touchpads, optical touchpads, joysticks and the like, and may include additional buttons 612 that are located separately from keyboards 608. Touch screen displays 606, keyboards 608, navigation actuators 610 and buttons 612 are example user input components. It is contemplated that other types of user input components may be included in mobile communication device 600. A status of each user input component of mobile communication device 600 may be readable by processor 602.

A non-exhaustive list of examples of processors 602 includes microprocessors, microcontrollers, central processing units (CPUs), digital signal processors (DSPs), reduced instruction set computers (RISCs), complex instruction set computers (CISCs) and the like. Furthermore, processors 602 may comprise more than one processing unit, may be part of an application specific integrated circuit (ASIC) or may be a part of an application specific standard product (ASSP).

A non-exhaustive list of examples of memory 604 includes any combination of the following:

a) semiconductor devices such as registers, latches, read only memory (ROM), mask ROM, electrically erasable programmable read only memory (EEPROM) devices, flash memory devices, non-volatile random access memory (NVRAM) devices, synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Mobile communication device 600 may include one or more camera modules 614 including image sensors 616. Processor 602 may operate image sensors 616 for capturing video images, still images, or both. In an example, image sensors 616 of different camera modules 614 may be facing opposite directions.

Mobile communication device 600 may include wireless communication interfaces 620, 622 and 624, coupled to processor 602. Communication interface 620 may comply with one or more cellular communication standards, communication interface 622 may comply with one or more WLAN communication standards, and communication interface 624 may comply with one or more PAN communication protocols.

Although communication interfaces 620, 622 and 624 may share components or functionality or both, for illustration purposes, FIG. 6 shows communication interface 620 as including at least a radio 626 and one or more antennae 628, while interface 622 is shown as including at least a radio 630 and one or more antennae 632, and interface 624 is shown as including at least a radio 634 and one or more antennae 636.

Mobile communication device 600 may include one or more wired communication interfaces 638, for example, a USB interface, an IEEE 1394 (Firewire™) interface, an Ethernet interface or any other suitable non-wireless interface. By way of any of communication interfaces 620, 622, 624 and 638, mobile communication device 600 may be able to establish signaling, voice, video and/or data communication sessions with other devices, for example, communication device 10, server 20 and computer 26 of FIG. 1. A non-exhaustive list of examples of data communication sessions includes receiving media files, such as media file 22, and/or receiving decompressed digital audio 24, sending and receiving one or more of electronic mail (e-mail), instant messages, paging messages, short message service (SMS) messages, and any other suitable data communication sessions. For executing communications supported by mobile communication device 600, memory 604 may store respective software applications 640 to be executed by any combination of processors 602.

A non-exhaustive list of examples for standards with which wireless communication interface 620 may comply includes Direct Sequence-CDMA (DS-CDMA) cellular radiotelephone communication, GSM cellular radiotelephone, North American Digital Cellular (NADC) cellular radiotelephone, Time Division Multiple Access (TDMA), Extended-TDMA (E-TDMA) cellular radiotelephone, wideband CDMA (WCDMA), General Packet Radio Service (GPRS), Enhanced Data for GSM Evolution (EDGE), 3G and 4G communication.

A non-exhaustive list of examples of standards with which wireless communication interface 622 may comply includes one or more standards of the 802.11 family of standards defined by the Institute of Electrical and Electronic Engineers (IEEE) for WLAN Media Access Control (MAC) layer and Physical (PHY) layer specifications.

A non-exhaustive list of examples of protocols with which wireless communication interface 624 may comply includes one or more Bluetooth® protocols developed by the Bluetooth® Special Interest Group (for example, Bluetooth® specifications 1.1, 1.2, 2.0, 2.1 and 3.0), one or more versions of the IEEE 802.15.1 standard, one or more versions of the IEEE 802.15.4 standard (Zigbee®), one or more versions of the Wireless Universal Serial Bus® (WUSB®) standard developed by the WUSB® Promoter Group.

Mobile communication device 600 may include an audio subsystem 644, including an audio coder-decoder (codec) 646 coupled to any of processors 602. Audio subsystem 644 may be configurable by any of processors 602, and a status of audio subsystem 644 may be readable by any of processors 602, as represented by an arrow 645.

Mobile communication device 600 may include an audio input element 648, for example a microphone, able to receive sound waves 650 and to output a corresponding analog signal 652 to audio codec 646. Mobile communication device 600 may include a second audio input element 654, for example a microphone, able to receive sound waves 656 and to output a corresponding analog signal 658 to audio codec 646. Mobile communication device 600 may also include an audio input interface 660 such as an electromechanical connector, such as a jack or socket. An external audio input element (not shown) may be coupled to audio input interface 660, which is able to provide analog signals 662 and 664, representative of sound waves, to audio codec 646.

Audio codec 646 may be able to receive any of analog signals 652, 658, 662 and 664, and to output one or more digital audio representations of analog signals 652, 658, 662 and 664 to processor 602 in a mono mode or in a stereo mode or both.

In stereo mode, audio codec 646 may separately sample analog signal 652 (or analog signal 662) and analog signal 658 (or analog signal 664) in parallel and may generate a digital audio representation 666 of analog signal 652 (or analog signal 662) and a digital audio representation 668 of analog signal 658 (or analog signal 664). Digital audio representations 666 and 668 may be stored in one of media files 642 in memory 604 for later playback. As known in the art, digital audio representations 666 and 668 may be separate bit streams or combined bit streams. A non-exhaustive list of examples for media files 642 includes MPG, MOV, MWV, XFL, MP3, ACC+, WAV, MIDI, WMA, AU, AIFF files or any other suitable files.

In mono mode, audio codec 646 may sample only one of analog signals 652, 658, 662 and 664 or any one combination thereof and may generate only one digital audio representation, for example digital audio representation 666. Digital audio representation 666 may be stored in one of media files 642 in memory 604 for later playback.

Digital audio representations 666 and 668 may be stored in memory 604 in conjunction with information of one or more other media types such as video, still pictures, presentation files and the like. For example, mobile communication device 600 may operate audio codec 646 in conjunction with camera module 614 to simultaneously capture video and audio, and may create a media file 642 that contains both video and audio. Alternatively, mobile communication device 600 may operate audio codec 646 in conjunction with camera module 614 to simultaneously capture video and audio, and may create in media files 642 a separate video file and audio file that may later be played simultaneously.

Mobile communication device 600 may include a first audio output element 670, for example a speaker, able to receive analog signals 672 and to output corresponding sound waves 674. Mobile communication device 600 may include a second audio output element 676, for example a speaker, able to receive analog signals 678 and to output corresponding sound waves 680.

Audio codec 646 may be able to receive digital audio representations of sound waves including one audio channel (mono) or two audio channels (stereo) and to generate analog signals 672 and 678 corresponding to the received digital audio representations of the sound waves. The source of the digital audio representations may be, for example, one of media files 642 or any other source. For example, in mono mode, audio codec 646 may receive a digital audio representation 682 of one audio channel and may construct analog signal 672 from digital audio representation 682. Optionally, audio codec 646 may output as analog signal 678 a duplicate of analog signal 672 constructed from digital audio representation 682. In another example, in stereo mode, audio codec 646 may receive digital audio representation 682 of one audio channel and a digital audio representation 684 of another audio channel in a synchronized manner. Audio codec 646 may construct analog signal 672 from digital audio representation 682 and at the same time may construct analog signal 678 from digital audio representation 684.

In an example, memory 604 may store a media player application 686 to be executed by processor 602. Media player application 686 is able to extract digital audio representations 682 and 684 from media files 642. Other applications stored in memory 604 may have this capability.

In conjunction with extracting digital audio representations 682 and 684 from media files 642, media player 686 and/or the other applications having this capability may use an audio buffer 688 in memory 604 to temporarily store digital audio representations 682 and 684. In a timely manner, digital audio representations 682 and 684 may be extracted from portions of a media file 642 into audio buffer 688 before being transmitted to audio codec 646. In an alternative example, digital audio representations 682 and 684 may be received in real time ("streamed") from an external source, such as any one of communication device 10, server 20 and computer 26 described with respect to FIG. 1. Mobile communication device 600 may receive digital audio representations 682 and 684 via any of communication interfaces 620, 622, 624 and 636 and may temporarily store digital audio representations 682 and 684 in audio buffer 688. Media player 686 or any other application of mobile communication device 600 may be involved in reception of digital audio representations 682 and 684. Media player 686 or any other application of mobile communication device 600 may transmit digital audio representations 682 and 684 to audio codec 646 while audio buffer 688 is refilled with subsequent digital audio representations.

Audio subsystem 644 may include an analog audio interface 690 to operate on any of analog signals 652, 658, 662, 664, 672 and 678. Analog audio interface 690 may provide functions such as signal amplification, signal conditioning, signal filtering, noise reduction, Electromagnetic Interference (EMI) reduction and other functions. Analog audio interface 690 and audio codec 646 may be fully integrated in one physical component, may be partially integrated or may be implemented using separate physical components.

For the purpose of readability, audio output element 670 is referred to as a handsfree speaker 670, and audio output element 676 is referred to as a receiver speaker 676. The terms "handsfree speaker" and "receiver speaker" refer to usage models of audio output elements 670 and 676, respectively, and to permitted maximal power levels of sound waves 674 and 680, respectively. The maximal power levels of sound waves 674 and 680 may be attributed to mechanical, acoustical and electrical properties of handsfree speaker 670 and of receiver speaker 676 and to their mechanical arrangement in mobile communication device 600. For example, a mechanical rear volume for a speaker appropriate for producing a maximal power of 500 mW might be in a range of 1.3 to 2 cubic centimeters while a mechanical rear volume for a speaker appropriate for producing a maximal power of 20 mW might be smaller.

"Maximal power setting" as used herein refers to the accumulated setting of one or more mechanical elements, hardware elements and software elements of the mobile communication device that affect and/or control the maximal power of analog signals 678 feeding receiver speaker 676 and hence the maximal power of sound waves 680 that receiver speaker 676 can generate from analog signals 678. The maximal power setting may also affect and/or control the maximal power of analog signals 672 feeding handsfree speaker 670 and hence the maximal power of sound waves 674 that handsfree speaker 670 can generate from analog signals 672.

For example, the maximal power setting may affect the amplification or attenuation or both of signals 672 and 678 at audio analog interface 690, the conversion of digital audio representations 682 and 684 at audio codec 646, the digital amplification or attenuation or both of digital audio representations 682 and 684 by media player 686 or other applications and so on.

"Current maximal power setting" as used herein refers to the maximal power setting used in the mobile communication device at any instant.

In a first mode of operation of mobile communication device 600, namely the "call mode", the maximal power setting in mobile communication device 600 limits the maximal power level of sound waves 680 to a power level suitable for receiver speaker 676 to be in close proximity to a human ear, for example, less than approximately 1.5 cm away. For example, mobile communication device 600 may operate in the call mode when conducting voice communications, for example, a telephone call or a VoIP call, with communication device 10.

In a second mode of operation of mobile communication device 600, namely the "multimedia mode", the maximal power setting in mobile communication device 600 limits the maximal power level of sound waves 680 to a power level suitable for receiver speaker 676 to be further from a human ear, for example, more than approximately 50 cm away.

Mobile communication device 600 may operate in the multimedia mode when voice communications involving mobile communication device 600, for example a telephone call or a VoIP call, are in progress and handsfree operation of mobile communication device 600 has been selected. In another example, mobile communication device 600 may operate in the multimedia mode during reproduction of sound from digital audio from media files 642 or from audio buffer 688 or from both. When operating in the multimedia mode, mobile communication device 600 may use both receiver speaker 676 and handsfree speaker 670 to reproduce sound. For example, mobile communication device 600, operating in the multimedia mode, may use handsfree speaker 670 to reproduce one of two audio channels and receiver speaker 676 to reproduce the other of the two audio channels simultaneously at high power. In another example, mobile communication device 600, operating in the multimedia mode, may use receiver speaker 676 and handsfree speaker 670 to simultaneously reproduce the same audio channel, for example, a mono audio channel.

Memory 604 may store call mode parameters 692 and multimedia mode parameters 694. Call mode parameters 692 may be indications of maximal power settings for the call mode, and multimedia mode parameters 694 may be indications of maximal power settings for the multimedia mode. For example, parameters 692 and 694 may include values to program into different functions of mobile communication device 600 so as to achieve desired limits for the maximal power levels. For example, to activate the call mode, mobile communication device 600 may configure any hardware components and/or any software components of mobile communication device 600 using call mode parameters 692. Similarly, to activate the multimedia mode, mobile communication device 600 may configure any hardware components and/or any software components of mobile communication device 600 with multimedia mode parameters 694. Such components to be configured may include analog audio interface 690, audio codec 646, media player 686, any of applications 640 or any other suitable component of mobile communication device 600. Non-limiting examples of such parameters for configuring the call mode and the multimedia mode are provided below with respect to FIGS. 7-1 and 7-2.

As indicated above, maximal power levels of sound waves 674 and 680 may be affected by many components of mobile communication device 600 and it may be possible to limit the maximal power levels in more than one way. Therefore, parameters 692 and 694 may include several sets of values, wherein configuring components of mobile communication device 600 with any of the sets of parameters might achieve the desired limits for the maximal power levels.

Moreover, upon entering the call mode or the multimedia mode, mobile communication device 600 may not necessarily be configured with the maximal power setting of that mode. For example, although it may be possible to generate a power level of 1500 mW in the multimedia mode, it may be more suitable to enter the multimedia mode using a much lower maximal power level. Accordingly, parameters 692 may include sets of values that are suitable for the call mode and provide maximal power levels that are lower than the call mode maximal power level. Similarly, parameters 694 may include sets of values that are suitable for the multimedia mode and provide maximal power levels that are lower than the multimedia mode maximal power level.

Furthermore, parameters 692 and 694 may include "conceptual" indications for the desired maximal power levels, such as indications in Watts or in any other suitable units. Mobile communication device 600 may compare expected maximal power levels from any set of values to the conceptual indications to ensure that using the set of values would not cause violation of the maximal power levels.

Further yet, parameters 692 and 694 may include "lookup tables" with parameters for the different maximal power settings. Any maximal power setting may have an entry in such a table, at which particular parameter values are available for configuring mobile communication device 600 for that maximal power setting. Mobile communication device 600 may be prevented from using parameter combinations that are not included in the tables.

Further yet, when a mode is selected, the current maximal power setting already configured in mobile communication device 600 may incidentally already be lower than the maximal power setting defined for that mode. Mobile communication device 600 may verify that indeed the current maximal power setting already configured in mobile communication device 600 is lower than the maximal power setting defined for that mode and, in some examples, mobile communication device 600 may not change the current maximal power setting. For example, the current maximal power setting in the multimedia mode might be set to 3 mW, which is also suitable for the call mode. Mobile communication device 600 may leave the current maximal power setting at 3 mW following entry into the call mode. While in the call mode, mobile communication device 600 may compare any attempt to increase the current maximal power setting with the maximal power setting defined for the call mode before approving and executing a change. Similarly, the current maximal power setting in the call mode might be set to 10 mW, which is also suitable for the multimedia mode. Mobile communication device 600 may leave the current maximal power setting at 10 mW following entry into the multimedia mode. While in the multimedia mode, mobile communication device 600 may compare any attempt to increase the current maximal power setting with the maximal power setting defined for the multimedia mode before approving and executing a change.

In both the call mode and the multimedia mode, mobile communication device 600 may provide a functionality of "volume setting" to software modules or to users or both for adjusting the current maximal power setting. For example, media player 686 or any of applications 640 may include functionality to provide automatic volume control or manual volume control or both. In another example, using any of user input components 606, 608, 610, 612, 648 and 654, a user may be able to request adjustment to the current maximal power setting. Mobile communication device 600 may monitor such attempts to adjust the current maximal power setting by software modules or by users or both and may adjust the maximal power setting provided the requested adjustment does not conflict with the maximal power setting defined for the mode currently in use. Mobile communication device 600 would prevent using a maximal power setting that is higher than the maximal power setting defined for the mode currently being used.

In one example, memory 604 may store a proxy module 696 to configure mobile communication device 600 into the call mode or into the multimedia mode or into both. Other software modules may be prevented from adjusting parameters that may affect the maximal power settings of the call mode or of the multimedia mode or of both. An attempt by any software module to adjust parameters that may affect the maximal power setting of the call mode or of the multimedia mode or of both may be received by proxy module 696. Proxy module 696 may adjust such parameters while ensuring not to override the maximal power setting dictated by call mode parameters 692 or by multimedia mode parameters 694 or by both.

As an example, access to configurations that may affect the maximal power setting of the call mode or of the multimedia mode or of both may be mapped as memory addresses or as Input/Output (I/O) addresses of mobile communication device 600. Mobile communication device 600 may monitor for attempts to write values to any of those addresses. If such an attempt is made by proxy module 696, mobile communication device 600 may allow the attempt. Otherwise, mobile communication device 600 may block the attempt and may execute proxy module 696 with the requested maximal power setting. Proxy module 696 may write to the addresses only values that do not violate the maximal power setting.

Mobile communication device 600 may include one or more sensors 698. When selecting between the call mode and the multimedia mode, mobile communication device 600 may optionally consider measurements obtained by one or more of sensors 698. Sensors 698 may provide sensing of, for example, one or more of a human body part, such as a head, an orientation of mobile communication device 600 and movement of mobile communication device 600. In one example, sensors 698 may include one or more capacitive sensors, inductive sensors, tactile sensors, optical sensors or piezoelectric sensors to sense proximity or contact or both of the head of a user. In another example, sensors 698 may include one or more active or passive light-sensing proximity detectors and may measure reflections of visible or infrared light to sense proximity to the head of a user. In a yet another example, sensors 698 may include one or more image sensors such as Charge-Coupled Device (CCD) image sensors or Complementary Metal-Oxide Semiconductor (CMOS) image sensors. In the case that sensors 698 include one or more image sensors, mobile communication device 600 may process images captured by the one or more image sensors to detect proximity of a human head. For example, any of camera modules 614 may be one of sensors 698. In a further example, sensors 698 may include accelerometers or gyroscopes or both to assess orientation and movement of mobile communication device 600. Mobile communication device 600 may optionally infer conditions for selecting between call mode and multimedia mode from the measured orientation and movement.

Figures 1, 7:
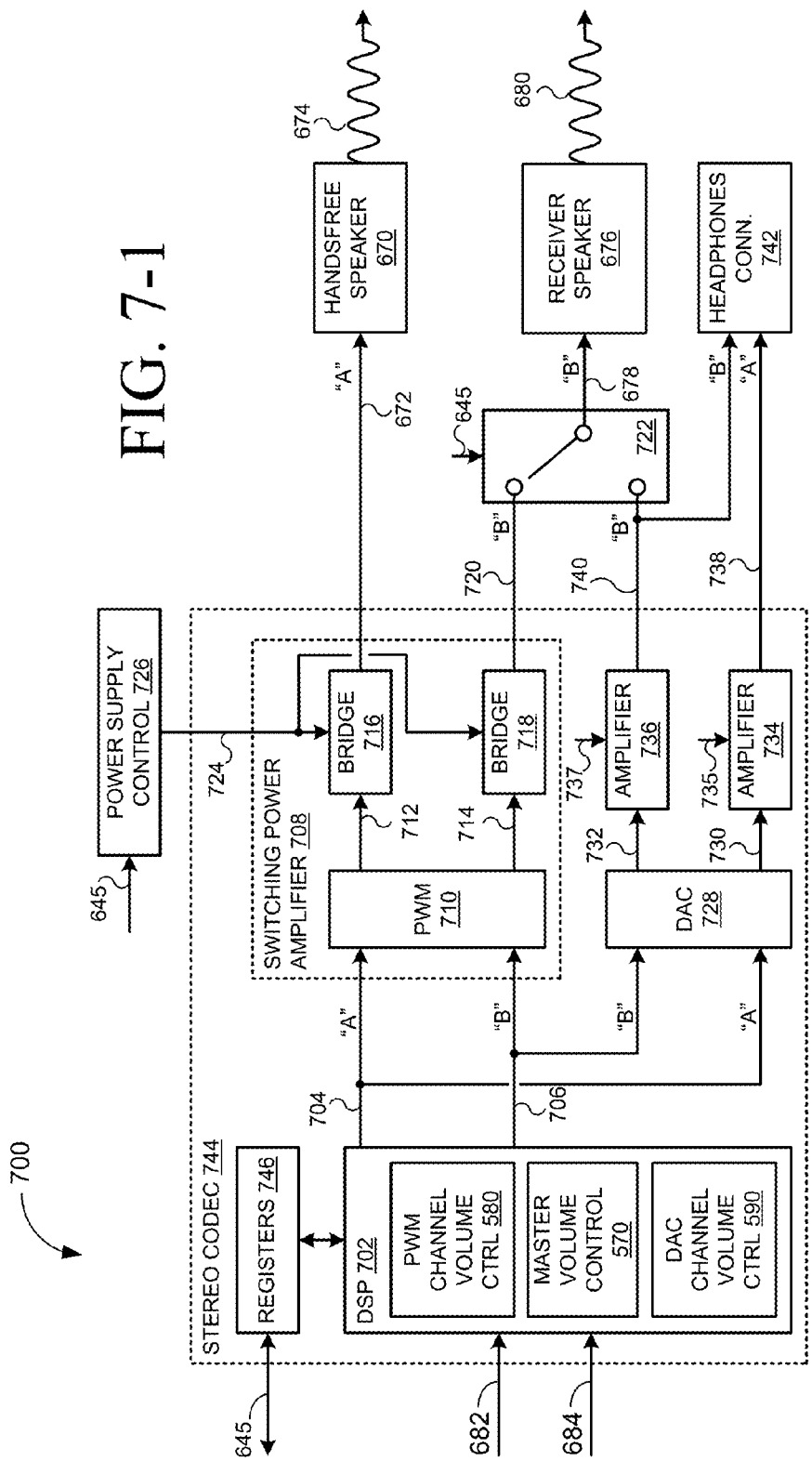
Figures 2, 7:
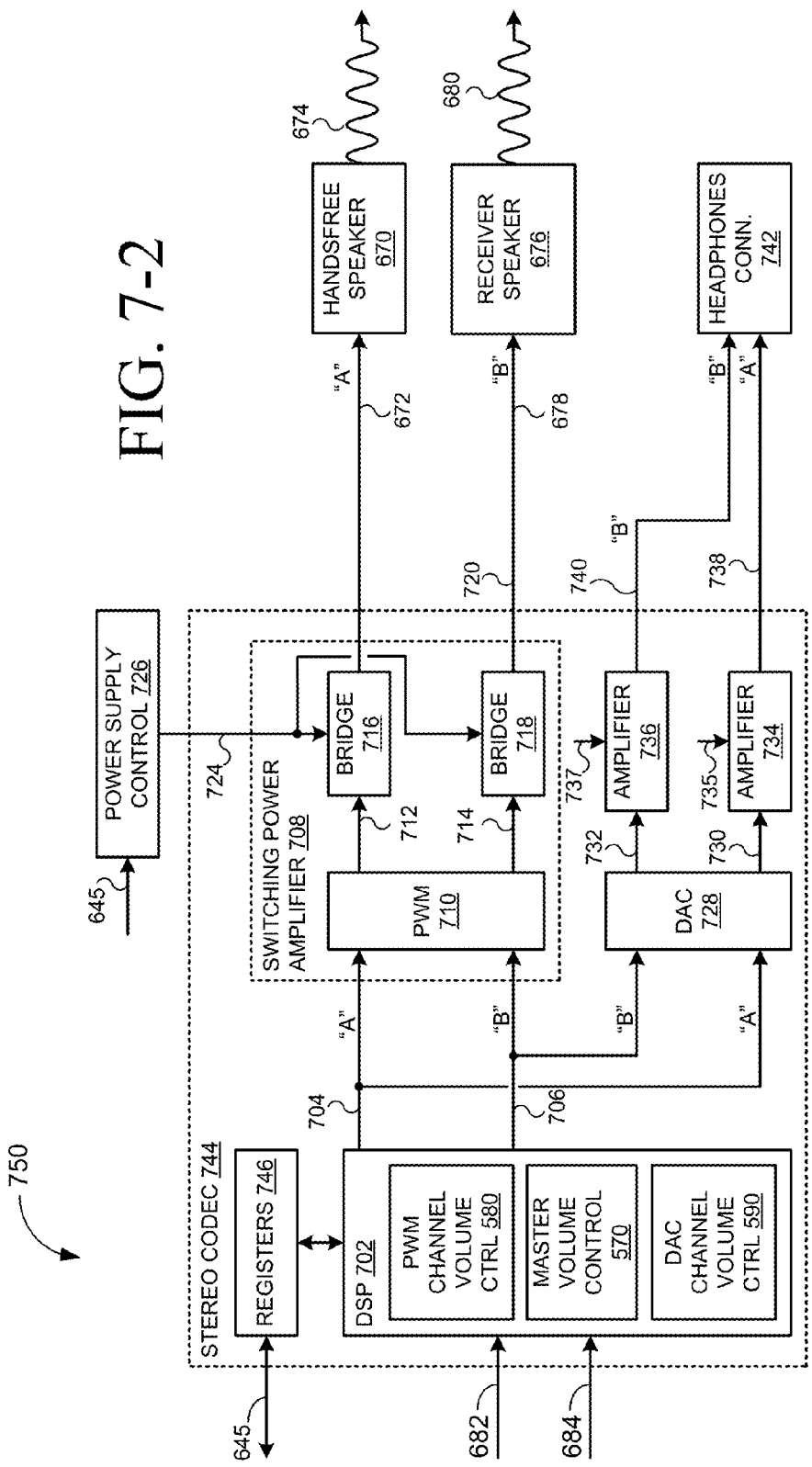

FIG. 7-1 is a simplified functional block diagram illustrating portions of an example audio subsystem 700. FIG. 7-2 is a simplified functional block diagram illustrating portions of an example audio subsystem 750. Audio subsystems 700 and 750 are examples of audio subsystem 644; however other examples of audio subsystem 644 are contemplated. Audio subsystem 700 or 750 may include components that, for clarity, are not shown in FIG. 7-1 or FIG. 7-2. Audio subsystems 700 and 750 may receive digital audio representations 682 and 684 and may provide receiver speaker 676 with analog signals 678 and may provide handsfree speaker 670 with analog signals 672 as described with respect to audio subsystem 644 of FIG. 6. Analog signals 678 may be a pair of differential signals or a pair of pseudo differential signals or may comprise signal ended signals. Similarly, analog signals 672 may be a pair of differential signals or a pair of pseudo differential signals or may comprise signal ended signals.

Audio subsystems 700 and 750 may include a Digital Signal Processor (DSP) 702 to receive digital audio representations 682 and 684, for example, as Pulse Code Modulation (PCM) serial data. In one example, DSP 702 may receive or fetch digital audio representations 682 and 684 from memory 604 using a Direct Memory Access (DMA) mechanism. In another example, processor 602 may control transmission of digital audio representations 682 and 684 to DSP 702.

DSP 702 may have other functionalities. For example, DSP 702 may be able to apply different signal processing functions to digital audio representations 682 and 684, including, for example, any or any combination of the following operations: signal shaping, signal limiting, tone control, channel swapping, channel mixing, stereo sound separation from mono audio, volume control and any other suitable operations. DSP 702 may output digital signals 704 and 706 representing audio information and resulting from any combination of digital audio representations 682 and 684, other inputs received by DSP 702 (not shown) and signal processing functions applied by DSP 702.

Digital signals 704 may be able to carry information of a first audio channel, labeled "A", and digital signals 706 may be able to carry information of a second audio channel, labeled "B". In one example, audio channels A and B may be a pair of stereo audio channels. In another example, audio channels A and B may carry the same audio information, for example, a mono combination of two stereo audio channels. In a yet another example, one of audio channels A and B may carry audio information while the other of channels A and B may be disabled or muted.

Audio subsystems 700 and 750 may include a switching power amplifier 708 to receive digital channels A and B (digital signals 704 and 706, respectively). Although any desired implementation of switching power amplifier 708 is contemplated, FIGS. 7-1 and 7-2 show an example simplified Pulse Width Modulation implementation of switching power amplifier 708. Switching power amplifier 708 may operate according to an operation scheme such as "A-B Class", "D Class" or any other suitable operation scheme.

Switching power amplifier 708 may include a Pulse Width Modulator (PWM) 710 to receive digital signals 704 and 706 and to output respective signals 712 and 714. Bridges 716 and 718 of switching power amplifier 708 receive signals 712 and 716, respectively, from PWM 710 and output analog signals 672 and 720, respectively. As shown in FIGS. 7-1 and 7-2, analog signals 672 (carrying channel "A") are an input to handsfree speaker 670. In FIG. 7-1, analog signals 720 (carrying channel "B") may be received by a switching system 722 that is able to route analog signals 720 (as analog signals 678) to receiver speaker 676. In contrast, switching system 722 is absent from audio subsystem 750, and in FIG. 7-2, analog signals 720 (carrying channel "B") may be provided (as audio signals 678) to receiver speaker 676.

Bridges 716 and 718 may be powered by dedicated power supply lines 724 and the voltage on power supply lines 724 may dictate the maximal power of signals 672 and 720. As an example, with voltage levels of 5.0 Volts (V), 3.7 V and 2.5 V on power supply lines 724, each of analog signals 672 and 720 may carry a maximal power of 1000 mW, 500 mW and 250 mW, respectively. An optional power supply control unit 726 may control the voltage level of power supply lines 724 and may consequently be capable of limiting the maximal power of analog signals 672 and 720. As an example, power supply control unit 726 may include a linear or switched power regulator with a controlled output voltage to output different voltage levels on power supply lines 724. In another example, power supply lines 724 may be supplied directly from a power rail (not shown) of mobile communication device 600 in the multimedia mode and may be supplied with a reduced voltage via a power regulator in the call mode.

Audio subsystems 700 and 750 may include a Digital to Analog Converter (DAC) 728 to receive digital signals 704 and 706 and to output respective analog signals 730 and 732.

Audio subsystems 700 and 750 may include amplification units 734 and 736, which receive analog signals 730 and 732, respectively, and output analog signals 738 and 740, respectively. Amplification units 734 and 736 may each include one or more amplifiers, any of which may be a Programmable Gain Amplifier (PGA). For example, gains of amplification units 734 and 736 may be controlled using control signals 735 and 737, respectively. For readability, amplification units 734 and 736 are referred to as amplifiers 734 and 736, respectively. The gain of amplifier 734 is lower than the gain of switching power amplifier 708. That is, amplifier 734 is weaker than switching power amplifier 708. Similarly, the gain of amplifier 736 is lower than the gain of switching power amplifier 708. That is, amplifier 736 is weaker than switching power amplifier 708. Analog signals 738 and 740 may have, for example, a maximal power level of 10 mW to 50 mW and may optionally be received by a headphone connector 742. As shown in FIG. 7-1, analog signals 740 (carrying channel "B") may be received by switching system 722 that is able to route analog signals 740 (as analog signals 678) to receiver speaker 676.

Operational elements of audio subsystems 700 and 750 shown in FIGS. 7-1 and 7-2 may be distributed in any desired fashion and using hardware components of any integration level. As a non-limiting example, a stereo codec, represented by a box 744, may comprise DSP 702, switching power amplifier 708, DAC 728 and amplifiers 734 and 736. Stereo codec 744 may include registers 746 that are programmable by processor 602 to control operation of elements of stereo codec 744, as represented by arrow 645 in FIGS. 6, 7-1 and 7-2. Additionally, a status of stereo codec 744 may be readable by processor 602. Physical components that are external to stereo codec 744, for example power supply control 726 and switching system 722, may be controllable via registers 746 and via corresponding output signals from stereo codec 744. Alternatively, such components may be controllable directly by signals originated from outside of audio subsystems 700 and 750, for example signals represented by arrow 645.

In alternative examples, any of DSP 702, switching power amplifier 708, DAC 728 and amplifiers 734 and 736 may not be a part of one, highly integrated codec chip. Accordingly, distribution of control signals may be different than the examples shown in FIGS. 7-1 and 7-2. In a yet alternative example applicable to audio subsystem 700, switching system 722 may also be included in stereo codec 744.

In the case that stereo codec 744 is integrated, registers 746 may provide processor 602 with control over the maximal power of analog signals 672 and 678 (channels A and B, respectively) when fed into handsfree speaker 670 and receiver speaker 676, respectively. Consequently, mobile communication device 600 may be set to operate in the call mode or in the multimedia mode.

In one example, applicable to audio subsystem 700, switching system 722 is configured to route analog signals 740 to receiver speaker 676 while mobile communication device 600 is operative in the call mode and to route analog signals 720 to receiver speaker 676 while mobile communication device 600 is operative in the multimedia mode.

In another example, applicable to audio subsystem 750, power supply control 726 is controlled to provide voltage at a higher voltage level (for example, 5.0 V) on dedicated power supply lines 724 while mobile communication device 600 is operative in the multimedia mode, and to provide voltage at a lower voltage level (for example, 2.5 V or 1.8 V) on dedicated power supply lines 724 while mobile communication device 600 is operative in the call mode.

In a yet another example, handsfree speaker 670 is muted while mobile communication device 600 is operative in the call mode.

In a yet another example, power levels of signals 672, 720, 738 and 740 may be controllable via registers 746 and "volume control" mechanisms of stereo codec 744. An example master volume control 570 may control amplification and attenuation of both the A and B channels in a range of, for example, −102 dB to +12 dB. Alternatively or in addition, a speaker volume control, for example PWM channel volume control 580, may control amplification and attenuation of any of signals 672 and 720 generated by switching power amplifier 708 in a range of, for example, −96 dB to +0 dB. Alternatively or in addition, a headphones volume control, for example DAC channel volume control 590, may control amplification and attenuation of any of signals 738 and 740 generated by amplifiers 734 and 736, respectively, in a range of, for example, −96 dB to +0 dB. Alternatively or in addition, an analog volume control (not shown) may control amplifications of amplifiers 734 and 736 via signals 735 and 737 in a range of, for example, 0.4 to 1.2. Any desired combination of the volume control mechanism and controls for switch 722 and voltage 724 may be programmed to provide the adequate power levels while mobile communication device 600 is operative in the call mode and while mobile communication device 600 is operative in the multimedia mode.

The examples provided above may be used in any combination to control the maximal power levels of sound waves generated by receiver speaker 676 while mobile communication device 600 is operative in the call mode and while mobile communication device 600 is operative in the multimedia mode.

Referring to FIG. 6, it may be noted that audio subsystem 644 is shown to include audio codec 646 and analog audio interface 690. However, due to the functionality of converting digital signals into the analog domain, components of audio subsystem 644 may be considered associated with one or both of audio codec 646 and analog audio interface 690. In the examples of FIGS. 7-1 and 7-2, DSP 702 is a digital component and may be associated with the "codec" portion. However, DAC 728, PWM 710 and bridges 716 and 718 perform the actual conversion from digital to analog and, as such, may be considered as parts of the "codec" or of the "analog interface". Moreover, amplifiers 734 and 736 may comprise purely analog components but may be included as a part in an integrated circuit under one name "codec". Therefore, it should be understood that divisions in audio subsystems 644, 700 and 750 are provided for illustration purposes and are not limiting.

Referring again to FIG. 6, memory 604 may store executable code 699 which, when executed by processor 602, causes mobile communication device 600 to perform the methods described herein.

Figure 8:
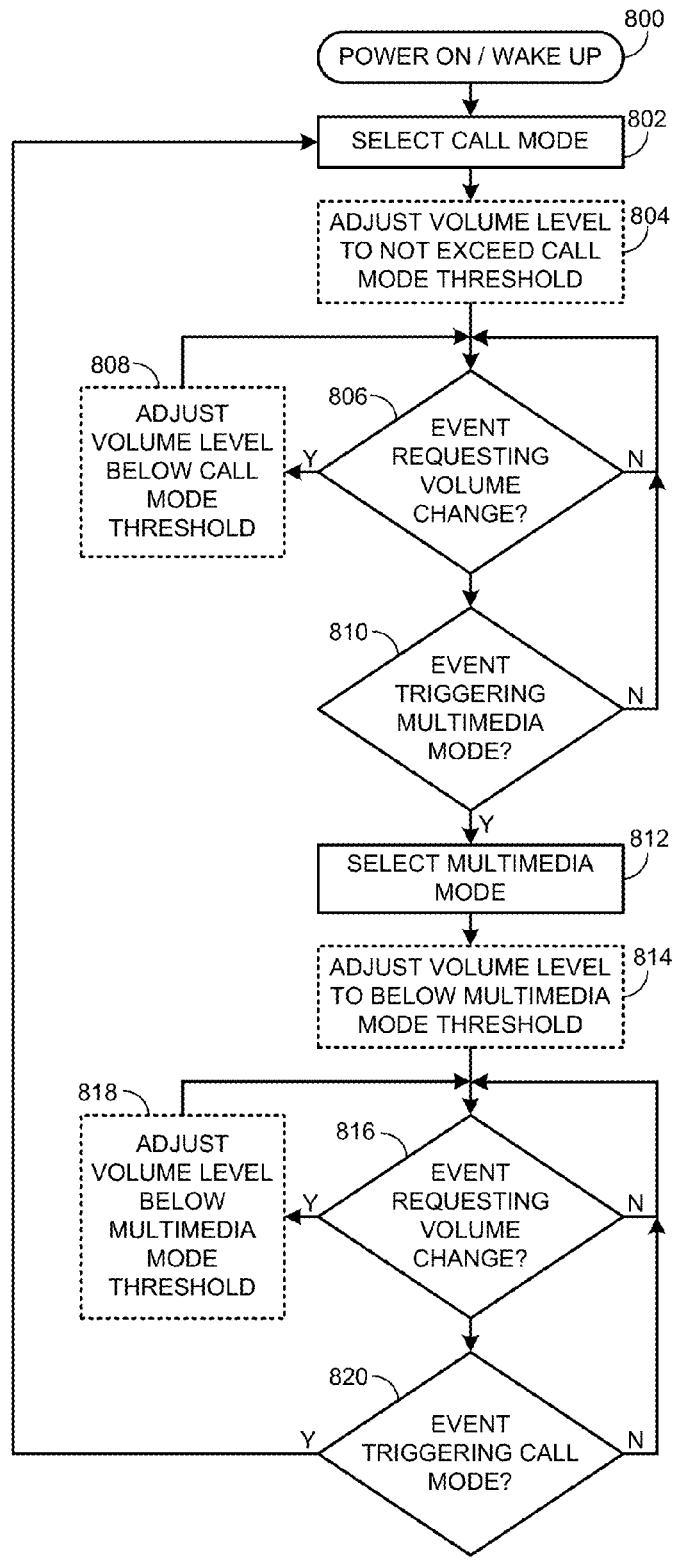
FIG. 8 is a flowchart for an example method for selecting between call mode and multimedia mode in a mobile communication device.

FIG. 8 is a flowchart for an example method for selecting between a call mode and a multimedia mode in mobile communication device 600. At 800, mobile communication device 600 is powered on or wakes up from a period of inactivity, such as from a sleep mode. At 802, mobile communication device 600 selects the call mode, for which the maximal power setting may be defined in call mode parameters 692. At 804, mobile communication device 600 checks whether the current maximal power setting is higher than the maximal power setting that is defined for the call mode and if so, mobile communication device 600 adjusts the current maximal power setting such that it does not exceed the maximal the power setting that is defined for the call mode.

At 806, mobile communication device 600 monitors for requests to change the current maximal power setting. As described, such a request may originate from user input components or from applications stored in mobile communication device 600 or from both. If such a request is identified, at 808, mobile communication device 600 may optionally adjust the current maximal power setting, providing that the current maximal power setting never exceeds the power setting that is defined for the call mode.

At 810, mobile communication device 600 monitors for events that may trigger a switch from the call mode to the multimedia mode. As long as such an event is not detected, mobile communication device 600 continues monitoring for events requesting volume change at 806 and for events triggering multimedia mode at 810. If such an event is detected, at 812, mobile communication device 600 enters the multimedia mode, for which, the maximal power setting may be defined in multimedia mode parameters 694. At 814, mobile communication device 600 checks whether the current maximal power setting is higher than the maximal power setting that is defined for the multimedia mode and if so, mobile communication device 600 changes the current maximal power setting to be lower than the maximal power setting that is defined for the multimedia mode.

At 816, mobile communication device 600 monitors for requests to change the current maximal power setting. As described, such a request may originate from user input components or from applications stored in mobile communication device 600 or from both. If such a request is identified, at 818, mobile communication device 600 may optionally adjust the current maximal power setting, providing that the current maximal power setting never exceeds the maximal power setting that is defined for the multimedia mode.

At 820, mobile communication device 600 monitors for events that may trigger a switch from the multimedia mode to the call mode. As long as such an event is not detected, mobile communication device 600 continues monitoring at 816 and 820. If such an event is identified, the method continues to 802.

A non-exhaustive list of examples for events that may trigger mobile communication device 600 to select the call mode includes any combination of the following:
a) a power up sequence of mobile communication device 600;
b) a power down sequence of mobile communication device 600;
c) initiation of an inactivity mode of mobile communication device 600 such as a sleep mode, during which any portions of mobile communication device 600 are at least partly disabled in order to conserve power;
d) exiting an inactivity mode of mobile communication device 600;
e) receipt of an indication at any of the user input components of mobile communication device 600 that a user requests activation of the call mode;
f) expiration of a time-out for operation of mobile communication device 600 in the multimedia mode;
g) initiation or receipt or termination of a communication session involving voice at mobile communication device 600, such as a phone call or a video call;
h) launch or activation or termination of any application stored in memory 604, for example, any of applications 640 and multimedia player 686
i) commencement or termination of audio reproduction from any source in mobile communication device 600, for example, from media files 642, from audio buffer 688, or from streamed audio received from an external source;

j) detection or assumption made by any combination of sensors 698 that mobile communication device 600 is within a particular distance from a user's ear, for example, 50 cm, 20 cm, 10 cm or 5 cm away.

A non-exhaustive list of examples for events that may trigger mobile communication device 600 to select the multimedia mode includes any combination of the following:

a) an indication received at any of the user input components of mobile communication device 600 that a user requests activation of the multimedia mode;

b) an indication triggered by a timer to activate the multimedia mode.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of providing stereo sound in a mobile communication device, comprising:

operating the mobile communication device in a multimedia mode, such that a receiver speaker of the mobile communication device is able to produce sound waves having a maximum power level that exceeds a first maximum power level and that does not exceed a second maximum power level; and while the mobile communication device is operative in the multimedia mode, providing a first audio channel to a handsfree speaker of the mobile communication device and providing a second audio channel to the receiver speaker, wherein while the mobile communication device is operative in a call mode, the receiver speaker is unable to produce sound waves having a maximum power level that exceeds the first maximum power level.

2. The method as recited in claim 1, further comprising:
while the mobile communication device is operative in the call mode, detecting a volume increase request and configuring the audio subsystem according to a requested maximum power setting only if, at the requested maximum power setting, the maximal power level of sound waves produced by the receiver speaker will remain limited to not exceed the first maximum power level.

3. The method as recited in claim 1, wherein while the mobile communication device is operative in the call mode muting the handsfree speaker.

4. The method as recited in claim 3, wherein while the mobile communication device is operative in the call mode exiting a stereo mode.

5. The method as recited in claim 3, wherein while the mobile communication device is operative in the call mode entering a single speaker mode.

6. The method as recited in claim 1, further comprising:
in the multimedia mode, switching on a higher-gain power amplifier to provide a high-gain signal to both the first audio channel and the second audio channel; and in the call mode, switching on a lower-gain power amplifier that has a lower gain than the higher-gain power amplifier, the lower-gain amplifier providing a signal to the second audio channel and not the first audio channel.

7. The method of claim 6, wherein the lower-gain power amplifier includes a gain that is sufficiently low that, while the mobile communication device is operative in the call mode, placement of the receiver speaker less than 1.5 centimeters from a human ear is suitable.

8. The method of claim 6, further comprising routing the high gain signal to the handsfree speaker at a first end of the mobile communication device first speaker and the receiver speaker at a second end of the mobile communication device.

9. The method of claim 6, further comprising switching the receiver speaker between the high-gain power amplifier in the multimedia mode and the lower-gain power amplifier in the call mode.

10. The method of claim 1, wherein operating the mobile communication device in the call mode includes receiving digital audio representations or a portion thereof from signals received through the wireless communication interface.

11. The method of claim 1, wherein operating the mobile communication device in the multimedia mode includes accessing digital audio representations or a portion thereof from one or more media files stored in or accessible by the mobile communication device.

12. A method to be performed by a mobile communication device, comprising:

obtaining measurements from one or more sensors comprised in the mobile communication device; and based at least in part on the measurements, between a call mode of operation for the mobile communication device and a multimedia mode of operation for the mobile communication device, wherein while the mobile communication device is operative in the call mode, a maximal power level of sound waves produced by a receiver speaker of the mobile communication device is limited to not exceed a first maximum power level, and wherein while the mobile communication device is operative in the multimedia mode, the maximal power level of sound waves produced by the receiver speaker is limited to not exceed a second maximum power level that is higher than the first maximum power level;

and wherein while the mobile communication device is operative in the multimedia mode, a first audio channel is provided to a handsfree speaker of the mobile communication device and a second audio channel is provided to the receiver speaker.

13. The method as recited in claim 12, further comprising:
in response to selecting the call mode, configuring an audio subsystem of the mobile communication device according to a first maximum power setting; and in response to selecting the multimedia mode, configuring the audio subsystem according to a second maximum power setting.

14. The method as recited in claim 12, further comprising:
while the mobile communication device is operative in the call mode, detecting a volume increase request and configuring the audio subsystem according to a requested maximum power setting only if, at the requested maximum power setting, the maximal power level of sound waves produced by the receiver speaker will remain limited to not exceed the first maximum power level.

15. The method as recited in claim 12, wherein the one or more sensors are selected from a group including one or more capacitive sensors, inductive sensors, tactile sensors, optical sensors, and piezoelectric sensors to sense proximity or contact or both of a human head.

16. The method as recited in claim 12, wherein the one or more sensors include one or more active or passive light-sensing proximity detectors that measure reflections of visible or infrared light to sense proximity to a human head.

17. The method as recited in claim 12, wherein the one or more sensors include one or more image sensors, the method further comprising processing images captured by the one or more image sensors to detect proximity of a human head.

\* \* \* \* \*

UNITED STATES PATENT AND TRADEMARK OFFICE
CERTIFICATE OF CORRECTION

PATENT NO. : 8,699,963 B2
APPLICATION NO. : 13/239485
DATED : April 15, 2014
INVENTOR(S) : Chao Chen et al.

It is certified that error appears in the above-identified patent and that said Letters Patent is hereby corrected as shown below:

IN THE CLAIMS

Col. 21 Lines 43-44 should recite "call mode, detecting a volume increase request and configuring an audio subsystem of the mobile communication device according to a requested"

Col. 22 Line 6 should recite "mobile communication device and to the receiver"

Col. 22 Line 9 should recite "receiver speaker between the higher-gain power amplifier in the"

Col. 22 Lines 55-56 should recite "call mode, detecting a volume increase request and configuring an audio subsystem of the mobile communication device according to a requested"

Signed and Sealed this
Twentieth Day of October, 2015

Michelle K. Lee
*Director of the United States Patent and Trademark Office*